United States Patent [19]
Brock et al.

[11] Patent Number: 5,802,409
[45] Date of Patent: Sep. 1, 1998

[54] RETRACTABLE TWO TRACK HEAD ASSEMBLY WITH CONTROLLABLE ROLL STIFFNESS

[75] Inventors: George W. Brock, La Jolla; Sheldon W. Hower; Jeremiah F. Connolly, both of San Diego, all of Calif.

[73] Assignee: Eastman Kodak Company, Rochester, N.Y.

[21] Appl. No.: 903,475

[22] Filed: Jul. 30, 1997

[51] Int. Cl.[6] .................................................. G03B 17/24
[52] U.S. Cl. ........................................ 396/319; 396/320
[58] Field of Search ............................... 396/310, 311, 396/312, 319, 320; 360/104, 105, 109

[56] References Cited

U.S. PATENT DOCUMENTS

| | | | |
|---|---|---|---|
| 4,933,780 | 6/1990 | Wash et al. | 396/319 |
| 4,996,546 | 2/1991 | Pagano et al. | 396/319 |
| 5,005,031 | 4/1991 | Kelbe | 396/320 |
| 5,016,030 | 5/1991 | Dwyer et al. | 396/319 |
| 5,028,940 | 7/1991 | Pearson | 396/320 |
| 5,170,198 | 12/1992 | Cannon | 396/320 |
| 5,272,498 | 12/1993 | Wakabayashi | 396/320 |
| 5,274,522 | 12/1993 | Taillie | 360/130.3 |
| 5,307,100 | 4/1994 | Kubo | 396/319 |
| 5,351,102 | 9/1994 | Tsuji et al. | 396/320 |
| 5,353,078 | 10/1994 | Aoshima | 396/320 |
| 5,477,290 | 12/1995 | Takeshita | 396/319 |
| 5,483,312 | 1/1996 | Wada | 396/320 |
| 5,502,528 | 3/1996 | Czarnecki et al. | 396/319 |
| 5,555,043 | 9/1996 | Brock et al. | 396/320 |
| 5,559,568 | 9/1996 | Kazami et al. | 396/320 |

FOREIGN PATENT DOCUMENTS

| | | |
|---|---|---|
| 6-289501 | 10/1994 | Japan . |
| 7333723 | 12/1995 | Japan . |
| 92/21126 | 11/1992 | WIPO . |

*Primary Examiner*—Eddie C. Lee
*Attorney, Agent, or Firm*—William F. Noval

[57] ABSTRACT

In a photographic apparatus which handles film having a magnetic layer on one side for magnetically storing data on the film, a photographic film transport mechanism including a magnetic head suspension system that allows balanced roll motion of two magnetic heads while in contact with the nonplanar magnetic recording surface of film, and allows for in contact magnetic recording during transfer of data only, with release of the contact pressure at all other times, the mechanism comprising: a platen for confining film that is transported past the platen; a cantilever spring having one end fixed to the platen and a free end, the spring extending in the direction of transport of the film; a pair of magnetic heads; means for mounting the pair of magnetic heads side-by-side on the free end of the cantilever spring which allows the heads to rotate about a roll axis parallel to the film transport direction; and means coupled to the free end of the spring for moving the heads into and out of contact with the film.

3 Claims, 4 Drawing Sheets

RETRACTABLE TWO TRACK HEAD ASSEMBLY WITH CONTROLLABLE ROLL STIFFNESS

FIELD OF THE INVENTION

This invention relates in general to photographic apparatus and relates more particularly to a retractable two track head assembly for recording/reading data relative to magnetically coated film.

BACKGROUND OF THE INVENTION

In magnetic recording on photographic film inside a camera, a problem can arise if the forced contact between the magnetic head and film causes a planar distortion of the film in the image formation area. Because of this, magnetic recording heads cannot contact the film within the image frame or even adjacent to it during picture taking. Further, it is advantageous that friction forces between the film and the recording head be minimized during film thrusting. It is also advantageous to be able to record in the image frame while not adding to the length of the camera gate (see U.S. Pat. No. 5,502,528). It would also be advantageous to reduce the number of degrees of freedom of motion that the head assembly can have, since these motions induce film jitter motion that affects the recording reliability of the magnetic interface between the head gap and the film surface. Thus, U.S. Pat. No. 5,555,043 shows a head mounted on a gimbal spring, which is a part of a cantilever spring. The head is removed and loaded onto film by a cam situated half way along the cantilever. This assembly relies on a balance of the interface frictional forces to keep the single head in normal contact with the film surface. The continually changing head to film contact region produces jitter motion of the film at the gap, with consequent deterioration of record/reproduce reliability. Further, the overhang of the head and cantilever beyond the cam support produces vibration of the head during camera transport, with subsequent fatigue failure at the head assembly to the flexure.

The following patents do not provide a solution to these problems: U.S. Pat. Nos. 5,555,043; 5,502,528; 4,933,780; 4,996,546; 5,005,031; 5,016,030; 5,028,940; 5,274,522; 5,272,498; 5,307,100; 5,477,290; 5,351,102; 5,483,312; and 5,353,078; EP Patent 433,019; JP Patents 7,333,723; and 6,289,501; and PCT Application WO 9,221,126.

SUMMARY OF THE INVENTION

According to the present invention, there is provided a solution to the problems of the prior art.

According to a feature of the present invention, there is provided a photographic apparatus which handles film having a magnetic layer on one side for magnetically storing data on the film, a photographic film transport mechanism including a magnetic head suspension system that allows balanced roll motion of two magnetic heads while in contact with the nonplanar magnetic recording surface of film, and allows for in contact magnetic recording during transfer of data only, with release of the contact pressure at all other times, the mechanism comprising: a platen for confining film that is transported past the platen; a cantilever spring having one end fixed to the platen and a free end, the spring extending in the direction of transport of the film; a pair of magnetic heads; means for mounting the pair of magnetic heads side-by-side on the free end of the cantilever spring which allows the heads to rotate about a roll axis parallel to the film transport direction; and means coupled to the free end of the spring for moving the heads into and out of contact with the film.

ADVANTAGEOUS EFFECT OF THE INVENTION

The invention has the following advantages.

1. Friction forces between film and recording heads are minimized while film is transported.
2. Data may be recorded either outside of or inside the image area.
3. The number of degrees of motion of the magnetic head assembly are minimized.

DETAILED DESCRIPTION OF THE INVENTION

Figure 1A:
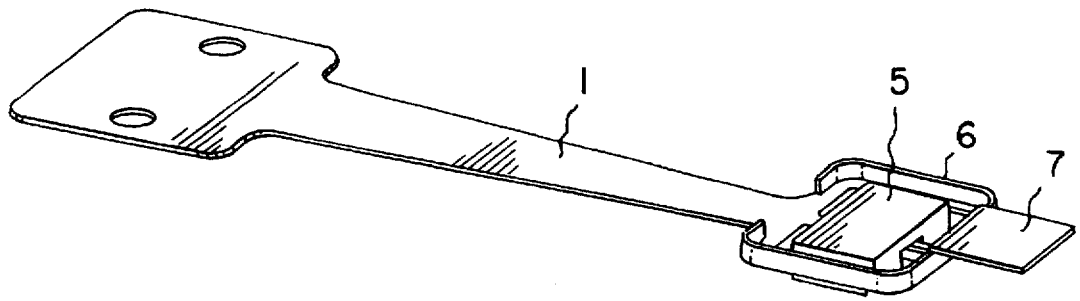
FIGS. 1(a)–1(b) shows a cantilevered spring suspension with head assembly.
Figure 1B:
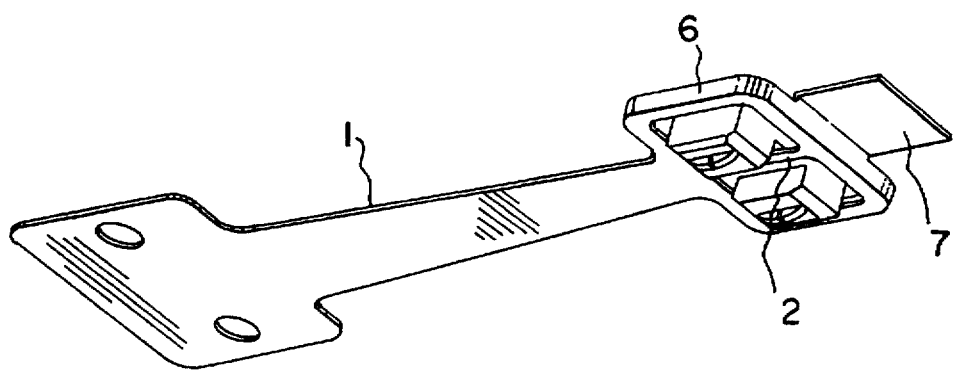

Referring now to the figures, there is shown an embodiment of the present invention. As shown in FIGS. 1(a)–1(b) and 2(a)–(c), the cantilever spring 1 is fixed in position 4 on the outer surface of the film confining platen 3 which confines film 100 within the camera or apparatus frame. The free spring end 6 consists of a spring assembly where the spring 1 has an additionally stiffened region 6 surrounding the two heads 8 on head assembly 5, but not including the center strip (roll axis) 2 to which is attached the two headed assembly 5. A similar stiffening could also be done by raised edges on the gimbal periphery 6. A tab 7 is formed on the end of the gimbal. This tab is raised or lowered by the action of cam 9 to load or unload the heads onto the film surface. The stiffened gimbal periphery 6 allows the head assembly 5 to be raised or lowered without flexing either its structure or the roll spring 2.

Figure 2A:
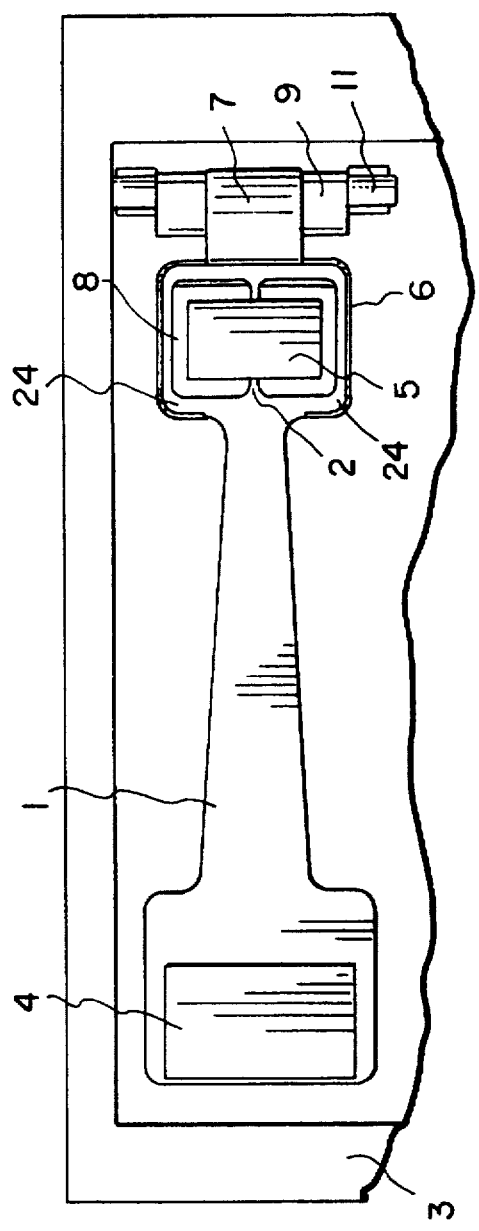
FIGS. 2(a)–2(c) shows the major components of the unloaded head actuation mechanism.
Figure 2B:
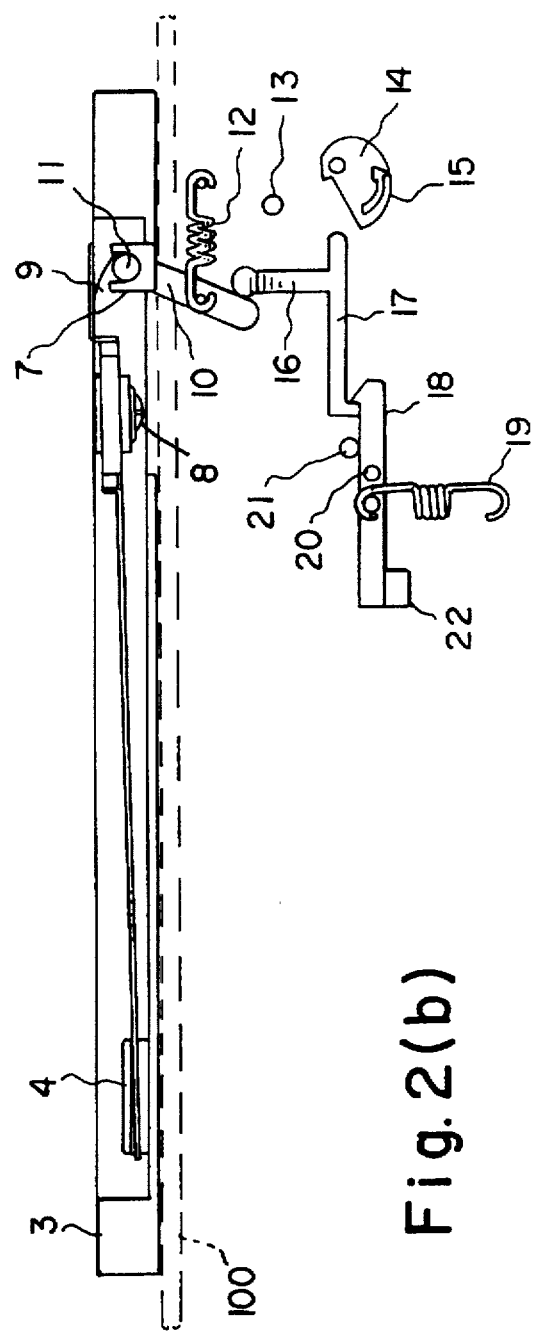
Figure 2C:
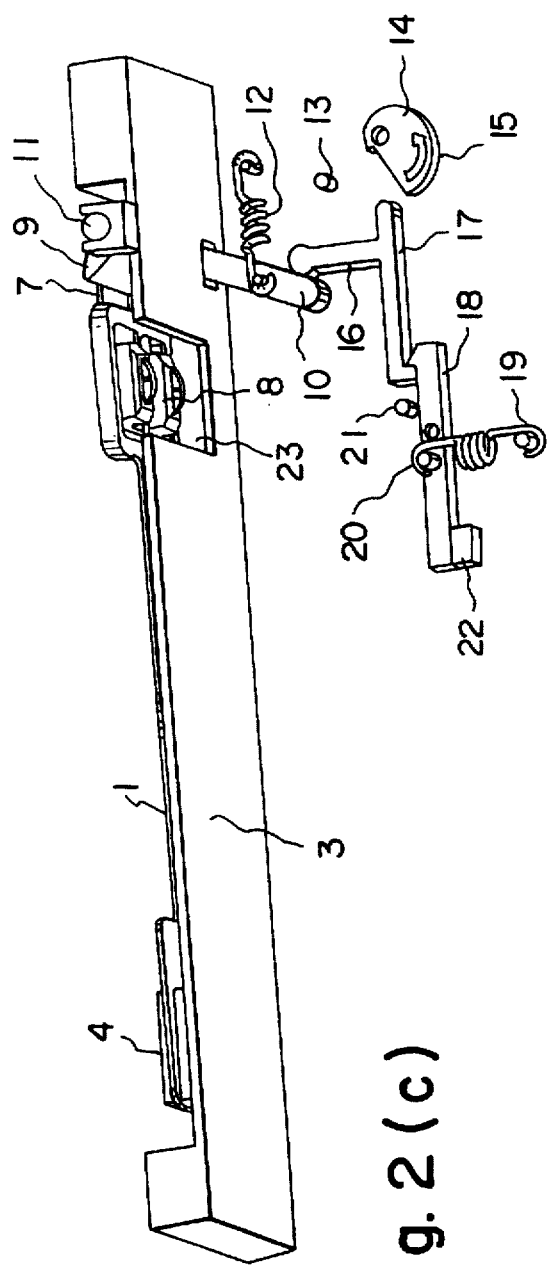

When the camera (or other film path system) is at rest and not transferring data, the head assembly 5 is unloaded from the film, as shown in FIGS. 2(a)–(c), by the action of the cam 9 and lever 10. The motion of the lever arm 10 is coupled to the camera action. When the heads 8 are out of contact with the film 100, they are essentially supported by the tab 7 and the cam 9. In this position, the spring head assembly is not free to vibrate during motion of the camera and is also supported during shock loads. During sliding contact, the head assembly 5 is able to adjust the contact position of the respective gaps with the film surface by a roll motion about the roll spring 2 during motion of the film.

The contact force of the heads against the film is controlled by the stiffness of spring 1 and its preset deflection. Accidental overload of the head 8 into the film 100 is prevented by stiffened region 6 on the head assembly contacting the opening 23 (FIG. 2(c)) in the platen 3. Tab 7 and cam 9 also restrict overpenetration.

A more specific explanation of the head load mechanism is as follows.

The cam 9 and lever 10 are one unit. The lever 10 is mounted on pivot 11 and biased counterclockwise by spring 12 acting on the cam 9 toward the "head-loaded" position shown in FIG. 3, which allows the spring 1 to engage the heads 8 onto the film's magnetic surface with a bias force of 10 to 30 grams. A second lever 17 is biased to the right by a spring 12 mounted on the camera body for rectilinear movement. The lever 17 has an arm 16 which engages a stop 13 under the influence of spring 12. A cam 14 (driven by a transmission as explained in U.S. Pat. No. 4,996,546) has a cam rise 15 which, upon rotation of the cam 14, will engage lever 17 and displace it to the left to lock onto lever 18. During such movement, the angled end of lever 17 will move by the latch portion of pivotal lever 18 mounted on a pin 20 and raised into engagement with a stop 21 by a spring 19. The angled end of lever 17 will become latched in the position shown in FIG. 2, and the lever 17 will be held in the position shown to unload the head assembly from the film surface. The lever 18 can subsequently be rotated clockwise against the tension of spring 19 to enable the parts to return to the position shown in FIGS. 3(a)–(c) with the heads loaded onto the film 100.

Figure 3A:
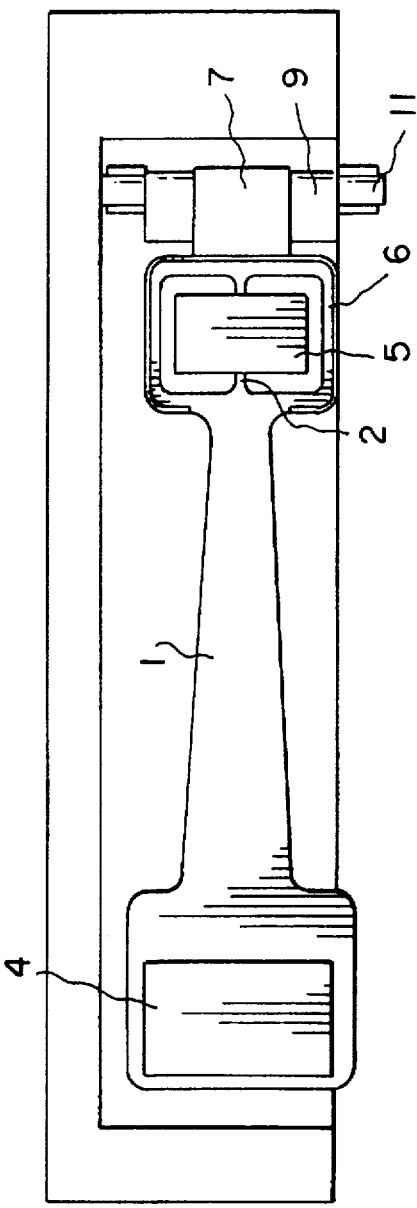
FIGS. 3(a)–3(c) shows the major components of the loaded head actuation mechanism.
Figure 3B:
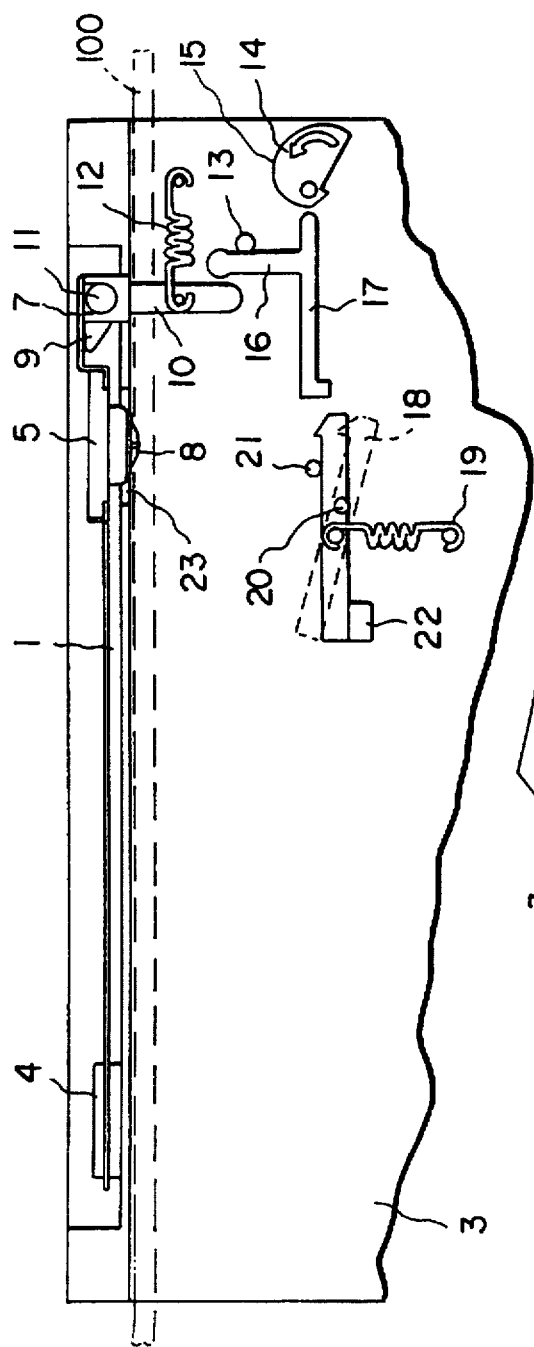
Figure 3C:
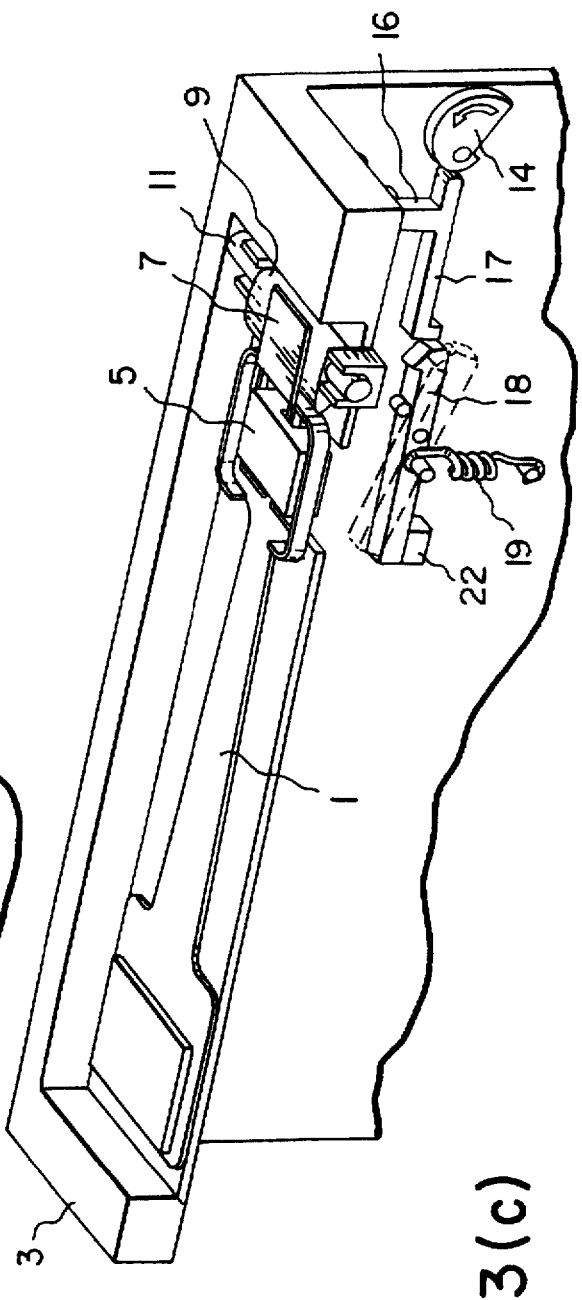

In operation, the lever 10 will assume the position shown in FIGS. 3(a)–(c) to allow the spring 1 to load the heads 8 onto the film's magnetic surface while the film 100 is in motion. Near the end of advance of the film frame, rise 15 of cam 14 will engage lever 17 and displace it to the left until it's angled end is latched by the end of lever 18. The parts will assume the position shown in FIG. 2, and the heads 8 will now be unloaded from the film surface.

At the end of the film exposure of a frame, the shutter release mechanism 22 will actuate lever 18 to release lever 17 so that the parts will again assume the position shown in FIG. 3 during the advancement of the next frame to an exposure position. The heads 8 are thus held into engagement with the film 100 during film 100 advancement to assure adequate magnetic coupling between the heads and magnetic coating, and released during film exposure to prevent distortion of the film plane, reduce sliding friction, and elimination of the impact of the film leader edge on the heads, while projecting into the films path during film loading.

It will be understood that the present invention can be used in any photographic apparatus such as cameras, photo-finishing equipment, film scanners, and other equipment wherein data can be written to or read from the magnetic layer of film.

While the invention has been shown and described with reference to a preferred embodiment thereof, it will be understood by those skilled in the art that modifications and variations may be made within the scope of the invention.

PARTS LIST 1 cantilever spring
2 roll spring
3 platen
4 position
5 head assembly
6 stiffened structure
7 tab
8 heads
9 cam
10 lever
11 cam pivot
12 spring
13 stop
14 cam
15 cam rise
16 arm
17 lever
18 pivotal lever
19 spring
20 pin
21 stop
22 shutter release mechanism
23 opening
100 film

What is claimed is:

1. In a photographic apparatus which handles film having a magnetic layer on one side for magnetically storing data on the film, a photographic film transport mechanism including a magnetic head suspension system that allows balanced roll motion of two magnetic heads while in contact with the film, and allows for in contact magnetic recording during transfer of data only, with release of the contact pressure at all other times, said mechanism comprising:

a platen for confining film that is transported past said platen;

a cantilever spring having one end fixed to said platen and a free end, said spring extending in the direction of transport of said film;

a pair of magnetic heads;

means for mounting said pair of magnetic heads side-by-side on the free end of said cantilever spring which allows said heads to rotate about a roll axis parallel to said film transport direction; and means coupled to said free end of said spring for moving said heads into and out of contact with said film.

2. The apparatus of claim 1 wherein said spring normally biases said magnetic heads into contact with film confined by said platen and wherein said means for moving moves said heads out of contact with said film in opposition to said spring bias.

3. The apparatus of claim 1 wherein said moving means includes a cam and lever mechanism which moves said heads out of film contact when said film is stationary and which moves said heads into contact with said film when said film is transported past said platen for recording or playing back data relative to said magnetic layer of said film.

* * * * *